United States Patent
Lee et al.

(10) Patent No.: US 11,938,787 B2
(45) Date of Patent: Mar. 26, 2024

(54) VEHICULAR AIR CONDITIONING SYSTEM

(71) Applicant: Hanon Systems, Daejeon (KR)

(72) Inventors: Seung Ho Lee, Daejeon (KR); Seo Jun Yoon, Daejeon (KR); Sang Ki Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 592 days.

(21) Appl. No.: 17/044,539

(22) PCT Filed: Jul. 22, 2019

(86) PCT No.: PCT/KR2019/009002
§ 371 (c)(1),
(2) Date: Oct. 1, 2020

(87) PCT Pub. No.: WO2020/022715
PCT Pub. Date: Jan. 30, 2020

(65) Prior Publication Data
US 2021/0146752 A1    May 20, 2021

(30) Foreign Application Priority Data

Jul. 25, 2018 (KR) .................. 10-2018-0086553
Jul. 19, 2019 (KR) .................. 10-2019-0087663

(51) Int. Cl.
*B60H 1/00* (2006.01)
*B60H 3/06* (2006.01)
*B60H 1/12* (2006.01)

(52) U.S. Cl.
CPC ..... *B60H 1/00849* (2013.01); *B60H 1/00564* (2013.01); *B60H 3/0608* (2013.01);
(Continued)

(58) Field of Classification Search
CPC ............ B60H 1/00849; B60H 1/00564; B60H 3/0608; B60H 1/12; B60H 2001/00085; B60H 2001/00135
See application file for complete search history.

(56) References Cited

U.S. PATENT DOCUMENTS 5,720,181 A * 2/1998 Karl .................... B60H 1/00849
454/258
5,971,287 A * 10/1999 Kettner .............. B60H 1/00785
165/230

(Continued)

FOREIGN PATENT DOCUMENTS

JP         3978845 B2      9/2007
JP      2017-171123 A      9/2017
(Continued)

*Primary Examiner* — Tho V Duong
(74) *Attorney, Agent, or Firm* — Norton Rose Fulbright US LLP; James R. Crawford

(57) ABSTRACT

A vehicular air conditioning system includes an intake unit configured to inhale an indoor air and an outdoor air. The intake unit includes an outdoor air inlet configured to introduce the outdoor air, an indoor air inlet configured to introduce the indoor air and a plurality of doors configured to selectively open the outdoor air inlet and the indoor air inlet. The intake unit further includes an auxiliary indoor air introduction part configured to introduce the indoor air. The auxiliary indoor air introduction part is configured to introduce a part of the indoor air existing on the side of the indoor air inlet.

12 Claims, 5 Drawing Sheets

(52) U.S. Cl.
CPC .............. *B60H 2001/00085* (2013.01); *B60H 2001/00135* (2013.01); *B60H 1/12* (2013.01)

(56) References Cited

U.S. PATENT DOCUMENTS

| | | | | |
|---|---|---|---|---|
| 2005/0059336 | A1* | 3/2005 | Shindou | B60H 1/00849 454/139 |
| 2012/0252339 | A1* | 10/2012 | Senthil | B60H 1/00785 454/75 |
| 2014/0065943 | A1* | 3/2014 | Clemence | B60H 1/24 454/236 |
| 2018/0099539 | A1* | 4/2018 | Han | B60H 1/00535 |
| 2020/0346519 | A1* | 11/2020 | Haupt | B60H 1/00685 |

FOREIGN PATENT DOCUMENTS

| | | |
|---|---|---|
| KR | 10-2013-0033029 A | 4/2013 |
| KR | 10-2016-0107415 A | 9/2016 |
| KR | 101836694 B1 | 3/2018 |

\* cited by examiner

PRIOR ART

VEHICULAR AIR CONDITIONING SYSTEM

This application is a national phase under 35 U.S.C. § 371 of International Application No. PCT/KR2019/009002 filed Jul. 22, 2019, which claims the benefit of priority of Korean Patent Application Nos. 10-2018-0086553 filed Jul. 25, 2018 and 10-2019-0087663 filed Jul. 19, 2019. The entire contents of these applications are incorporated herein by reference in their entirety.

TECHNICAL FIELD

The present invention relates to a vehicular air conditioning system and, more particularly, to a vehicular air conditioning system capable of improving an installation position and structure of an auxiliary indoor air introduction part so that the structure of the auxiliary indoor air introduction part can be adopted even when an intake unit is installed on the side of an engine room, whereby the air conditioning efficiency in a passenger compartment can be enhanced.

BACKGROUND ART

A motor vehicle is equipped with an air conditioning system that cools and heats a passenger compartment. The air conditioning system includes an intake unit for inhaling air existing inside or outside the passenger compartment.

As shown in FIG. 1, the intake unit includes an outdoor air inlet 12 formed in an air conditioning case 10, an indoor air inlet 14 formed in the air conditioning case 10, and an intake door 20 installed between the outdoor air inlet 12 and the indoor air inlet 14.

The outdoor air inlet 12 is configured to introduce air existing outside the passenger compartment (hereinafter referred to as "outdoor air"), and the indoor air inlet 14 is configured to introduce air existing inside the passenger compartment (hereinafter referred to as "indoor air").

The intake door 20 is formed in a dome type, and is rotatably installed in the air conditioning case 10. In particular, the intake door 20 rotates between an outdoor air mode position A and an indoor air mode position B to selectively open the outdoor air inlet 12 and the indoor air inlet 14 so that the outdoor air or the indoor air can be selectively introduced.

The intake unit further includes an auxiliary outdoor air introduction part 30. The auxiliary outdoor air introduction part 30 includes an auxiliary outdoor air inlet 32 and an auxiliary outdoor air door 34.

The auxiliary outdoor air inlet 32 is formed on one side of the outdoor air inlet 12, and is configured to be partitioned from the outdoor air inlet 12 and the indoor air inlet 14 with a partition wall 36 interposed therebetween. The auxiliary outdoor air inlet 32 has a smaller cross-sectional area than the outdoor air inlet 12 and is configured to introduce a relatively small amount of outdoor air.

The auxiliary outdoor air door 34 is of a flat type, and is rotatably installed in the air conditioning case 10. The auxiliary outdoor air door 34 rotates with respect to the outdoor air inlet 32 to adjust the opening degree of the auxiliary outdoor air inlet 32.

The auxiliary outdoor air inlet 30 is configured to introduce an "outdoor air" separately from the outdoor air inlet 12. Particularly, even when the outdoor air inlet 12 is completely closed by the intake door 20 in an indoor air mode, the auxiliary outdoor air door 34 is controlled in a partial outdoor air introduction mode to open the auxiliary outdoor air inlet 32, whereby a small amount of "outdoor air" is introduced.

Accordingly, even in a state where the outdoor air inlet 12 is closed, a small amount of "outdoor air" is introduced into the passenger compartment so that the air in the passenger compartment can be ventilated.

Referring again to FIG. 1, the intake unit further includes an auxiliary indoor air introduction part 40. The auxiliary indoor air introduction part 40 includes an auxiliary indoor air inlet 42 and an auxiliary indoor air door 44.

The auxiliary indoor air inlet 42 is configured to be formed in a portion of the air conditioning case 10 corresponding to the auxiliary outdoor air introduction part 30. In particular, the auxiliary indoor air inlet 42 is formed in a portion corresponding to the auxiliary outdoor air inlet 32 of the auxiliary outdoor air introduction part 30. The auxiliary indoor air inlet 42 formed in this way sucks a small amount of indoor air and introduces the sucked indoor air into an air filter 50 on the downstream side corresponding to the auxiliary outdoor air introduction part 30.

The auxiliary indoor air door 44 is of a flap type and is configured to open or close the auxiliary indoor air inlet 42 while being bent and deformed according to the pressure inside the air conditioning case 10.

The auxiliary indoor air introduction part 40 is configured to introduce an indoor air separately from the indoor air inlet 14. In particular, the indoor air may be introduced into one side portion 50a of the air filter 50 corresponding to the auxiliary outdoor air introduction part 30.

Therefore, it is possible to utilize the one side portion 50a of the air filter 50 corresponding to the auxiliary outdoor air introduction part 30.

In particular, in the indoor air mode, both the outdoor air inlet 12 and the auxiliary outdoor air inlet 32 are closed. Thus, one side portion 50a of the air filter 50 corresponding to the auxiliary outdoor air inlet 32 exists as a dead area where there is no air flow. By introducing the indoor air into the one side portion 50a of the air filter 50 in the dead area, it becomes possible to utilize the one side portion 50a of the air filter 50. As a result, the air conditioning efficiency in the passenger compartment is improved.

By the way, as shown in FIG. 1, in such a conventional air conditioning system, when the intake unit is installed inside the passenger compartment, the auxiliary indoor air introduction part 40 of the air conditioning case 10 is located inside the passenger compartment. Therefore, there is no difficulty in introducing the indoor air. However, when the intake unit is installed on the side of an engine room, there is a disadvantage in that it is difficult to introduce the indoor air because the auxiliary indoor air introduction part 40 of the air conditioning case 10 is located on the side of the engine room.

Due to this drawback, when the intake unit is installed on the side of the engine room, there is a problem that it is difficult to adopt the auxiliary indoor air introduction part 40. Therefore, when the intake unit is installed on the side of the engine room, it is impossible to use one side portion 50a of the air filter 50.

Particularly, in the indoor air mode, one side portion 50a of the air filter 50 corresponding to the auxiliary outdoor air inlet 32 cannot be used in a state in which both the outdoor air inlet 12 and the auxiliary outdoor air inlet 32 are closed. Therefore, one side portion 50a of the air filter 50 has to exist as a dead area. As a result, there is a problem that the air conditioning efficiency in the passenger compartment is deteriorated.

SUMMARY

In view of the aforementioned problems inherent in the related art, it is an object of the present invention to provide a vehicular air conditioning system capable of improving an installation position and structure of an auxiliary indoor air introduction part so that the structure of the auxiliary indoor air introduction part can be adopted even when an intake unit is installed on the side of an engine room.

Another object of the present invention is to provide a vehicular air conditioning system capable of introducing air to one side portion of an air filter through the use of an auxiliary indoor air introduction part even though an intake unit is installed on the side of an engine room.

A further object of the present invention is to provide a vehicular air conditioning system capable of utilizing the entire portion of an air filter without leaving a dead area.

A still further object of the present invention is to provide a vehicular air conditioning system capable of enhancing the air conditioning efficiency in a passenger compartment.

According to one aspect of the present invention, there is provided a vehicular air conditioning system, comprising: an intake unit configured to inhale an indoor air and an outdoor air, the intake unit including an outdoor air inlet configured to introduce the outdoor air, an indoor air inlet configured to introduce the indoor air and a plurality of doors configured to selectively open the outdoor air inlet and the indoor air inlet, wherein the intake unit further includes an auxiliary indoor air introduction part configured to introduce the indoor air, and the auxiliary indoor air introduction part is configured to introduce a part of the indoor air existing on the side of the indoor air inlet.

In the system, the intake unit may further include an auxiliary outdoor air inlet configured to introduce the outdoor air and a partition wall configured to separate the indoor air inlet and the outdoor air inlet from the auxiliary outdoor air inlet, and the auxiliary indoor air introduction part may be installed on the partition wall to introduce the indoor air existing in the indoor air inlet.

In the system, the auxiliary indoor air introduction part may include: an auxiliary indoor air inlet formed in the partition wall so as to introduce a part of the indoor air existing on the side of the indoor air inlet and send the introduced indoor air toward the auxiliary outdoor air inlet; and a flap type auxiliary indoor air door installed on the partition wall so that when a pressure on the side of the auxiliary outdoor air inlet is lower than a pressure on the side of the indoor air inlet, the auxiliary indoor air door opens the auxiliary indoor air inlet according to a differential pressure.

In the system, the intake unit may further include an air filter installed on a downstream side of the indoor air inlet, the outdoor air inlet and the auxiliary outdoor air inlet to filter the air inhaled through the indoor air inlet, the outdoor air inlet and the auxiliary outdoor air inlet, and the auxiliary indoor air introduction part may be configured to introduce a part of the indoor air existing on the side of the indoor air inlet and send the introduced indoor air to one side portion of the air filter corresponding to the auxiliary outdoor air inlet.

With the vehicular air conditioning system according to the present invention, the auxiliary indoor air introduction part is configured to introduce the indoor air existing in the indoor air inlet. Therefore, the air can be introduced to one side portion of the air filter through the use of the auxiliary indoor air introduction part even though the intake unit is installed on the side of an engine room.

Furthermore, even when the intake unit is installed on the side of the engine room, the entire portion of an air filter can be utilized without leaving a dead area. As a result, it is possible to enhance the air conditioning efficiency in the passenger compartment.

Moreover, the auxiliary indoor air introduction part is configured to introduce the indoor air existing in the indoor air inlet. Therefore, the air can be introduced even though the intake unit is installed on the side of the engine room. Thus, the indoor air can be introduced to one side portion of the air filter regardless of the installation position of the intake unit.

In addition, the intake unit can be used interchangeably in both the vehicle model in which the intake unit is installed inside the passenger compartment and the vehicle model in which the intake unit is installed on the side of the engine room side. As a result, the cost reduction can be expected by enabling the common use of components.

DETAILED DESCRIPTION

Figure 1:
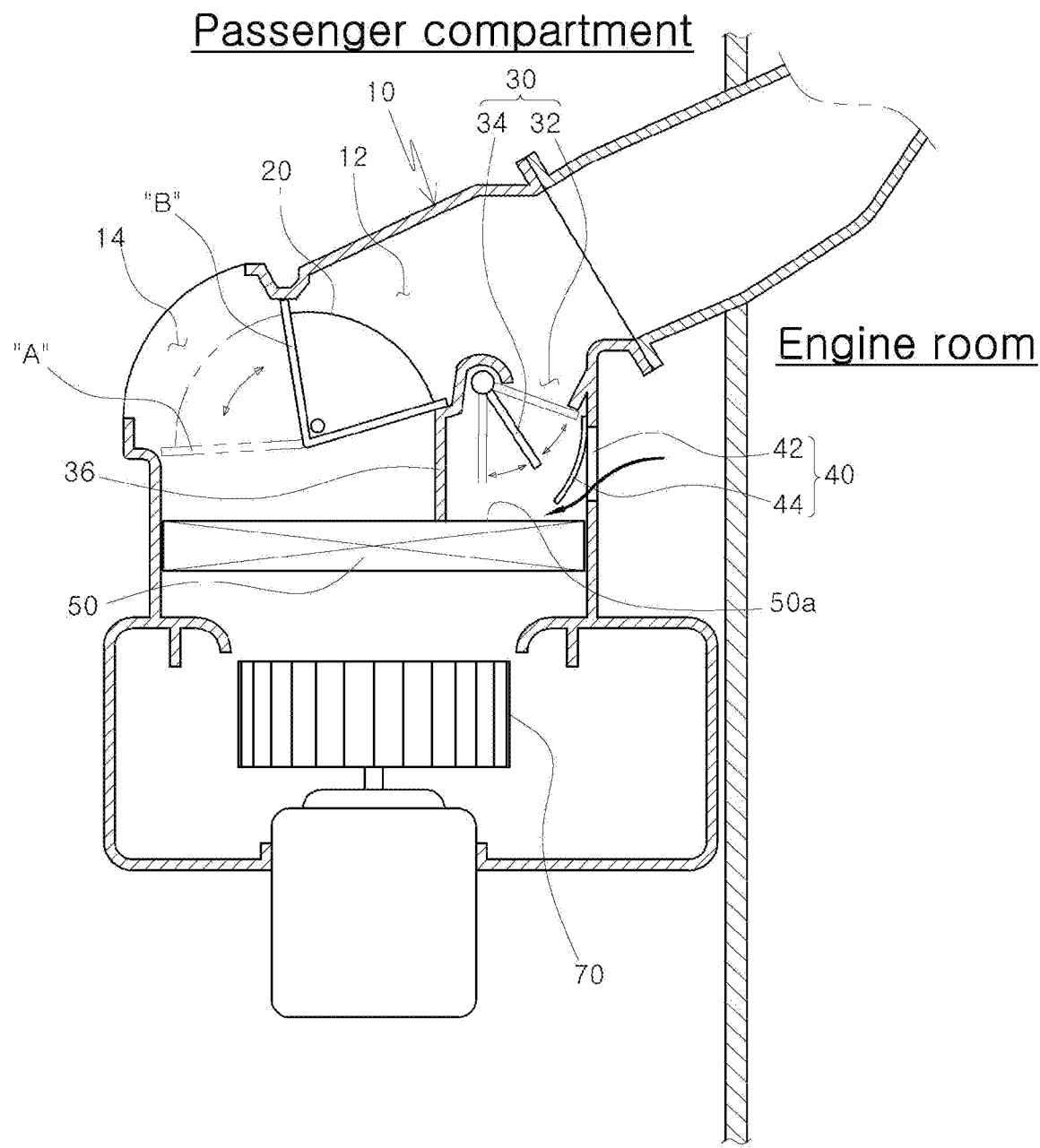
FIG. 1 is a view showing a conventional vehicular air conditioning system in which an intake unit is installed inside a passenger compartment.

Preferred embodiments of a vehicular air conditioning system according to the present invention will now be described in detail with reference to the accompanying drawings (The same components as those described in the section of Background Art will be designated by like reference numerals).

Figure 2:
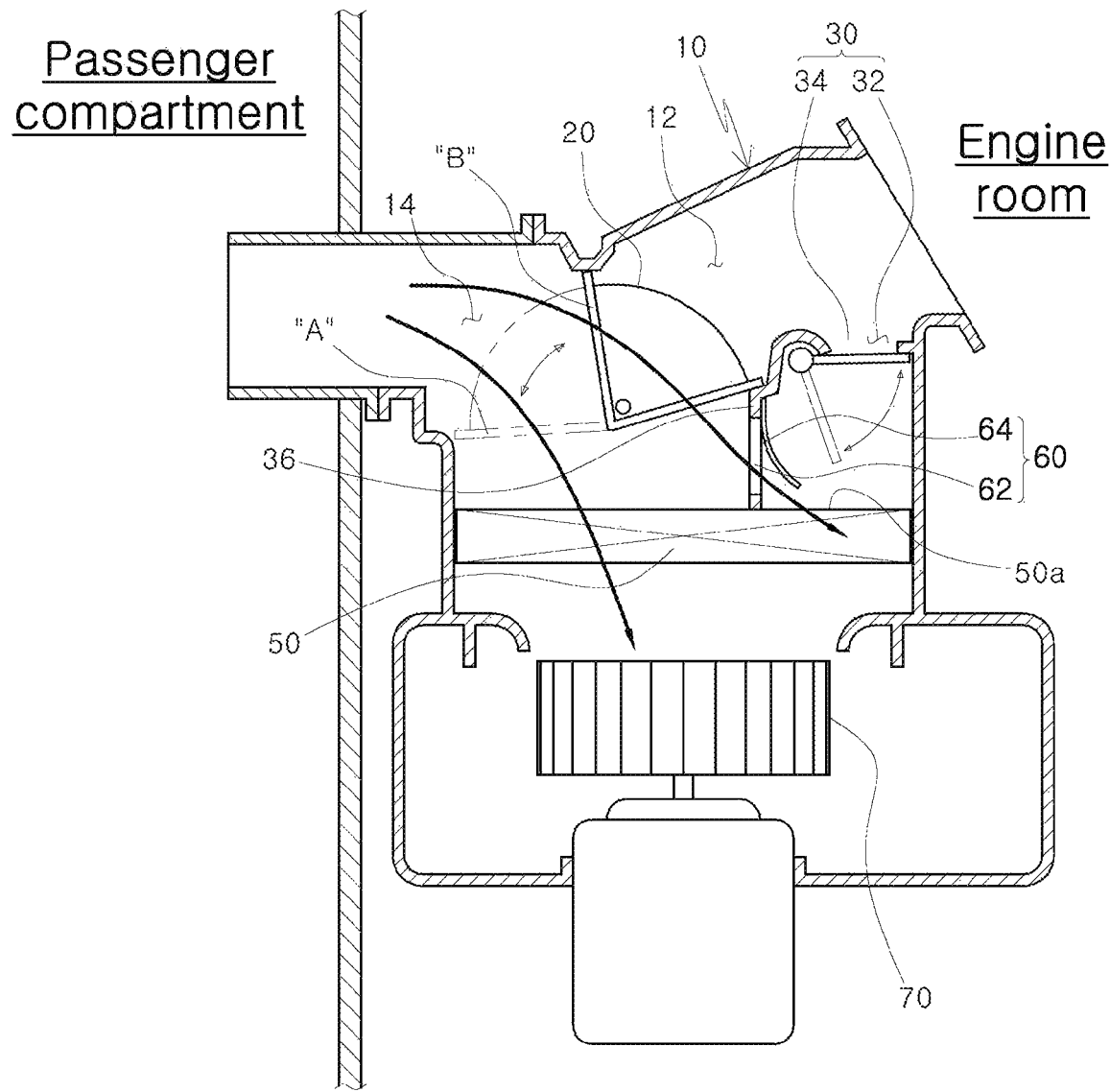
FIG. 2 is a view showing a vehicular air conditioning system according to one embodiment of the present invention in which an intake unit is installed on the side of an engine room.

Prior to describing features of a vehicular air conditioning system according to the present invention, the general configuration of the vehicular air conditioning system will be briefly described with reference to FIG. 2.

The vehicular air conditioning system includes an intake unit for inhaling the air existing inside and outside a passenger compartment.

The intake unit includes an outdoor air inlet 12, an indoor air inlet 14 and an intake door 20.

The outdoor air inlet 12 is in communication with the outside of the passenger compartment so that the outdoor air can be introduced therethrough. The indoor air inlet 14 is in communication with the inside of the passenger compartment through a duct so that the indoor air can be introduced therethrough.

The intake door 20 selectively opens the outdoor air inlet 12 or the indoor air inlet 14 while rotating between an outdoor air mode position A and an indoor air mode position B. Thus, it is possible to selectively introduce the outdoor air or the indoor air.

In addition, the intake unit further includes an auxiliary outdoor air introduction part 30 which in turn includes an auxiliary outdoor air inlet 32 and an auxiliary outdoor air door 34.

The auxiliary outdoor air inlet 32 is partitioned from the outdoor air inlet 12 and the indoor air inlet 14 with a partition wall 36 interposed therebetween, and is configured to introduce a relatively small amount of air existing outside the passenger compartment.

The auxiliary outdoor air door 34 is configured to adjust the opening degree of the auxiliary outdoor air inlet 32 while rotating with respect to the auxiliary outdoor air inlet 32.

This auxiliary outdoor air introduction part 30 is configured to introduce the outdoor air separately from the outdoor air inlet 12. In particular, in the indoor air mode, when the outdoor air inlet 12 completely closed by the intake door 20, the auxiliary outdoor air door 34 is controlled in a partial outdoor air introduction mode so as to open the auxiliary outdoor air inlet 32, thereby introducing a small amount of outdoor air.

Next, the features of the vehicular air conditioning system according to the present invention will be described in detail with reference to FIGS. 2 and 3.

First, in the air conditioning system according to the present invention, the intake unit is disposed in an engine room of a motor vehicle, and the intake unit disposed in the engine room further includes an auxiliary indoor air introduction part 60.

The auxiliary indoor air introduction part 60 is installed at the partition wall 36 that separates the outdoor air inlet 12 and the indoor air inlet 14 from the auxiliary outdoor air inlet 32. The auxiliary indoor air introduction part 60 includes an auxiliary indoor air inlet 62 and an auxiliary indoor air door 64.

The auxiliary indoor air inlet 62 is formed on the partition wall 36 that separates the outdoor air inlet 12 and the indoor air inlet 14 from the auxiliary outdoor air inlet 32. The auxiliary indoor air inlet 62 is configured to maintain direct communication with the indoor air inlet 14.

The auxiliary indoor air inlet 62 is configured to introduce the indoor air that flows into the indoor air inlet 14.

Particularly, in the indoor air mode, the auxiliary indoor air inlet 62 is configured to introduce the indoor air from the indoor air inlet 14 in a state where both the outdoor air inlet and the auxiliary outdoor air inlet 32 are closed. The introduced indoor air is introduced to one side portion 50a of the air filter 50 corresponding to the auxiliary outdoor air inlet 32.

The auxiliary indoor air door 64 is a flap type, and is bent according to the internal pressure of the air conditioning case 10 on the side of the auxiliary outdoor air inlet 32 to open or close the auxiliary indoor air inlet 62.

In particular, when the pressure on the side of the auxiliary outdoor air inlet 32 is lower than the pressure on the side of the indoor air inlet 14 due to the rotation of a blower 70, the auxiliary indoor air door 64 is bent by the differential pressure in such a direction as to open the auxiliary indoor air inlet 62.

The auxiliary indoor air introduction part 60 introduces the indoor air from the indoor air inlet 14 and sends the introduced indoor air to one side portion 50a of the air filter 50 corresponding to the auxiliary outdoor air inlet 32.

Particularly, in the indoor air mode, the auxiliary indoor air introduction part 60 introduces a part of the indoor air from the indoor air inlet 14 in a state where both the outdoor air inlet 12 and the auxiliary outdoor air inlet 32 are closed, and sends the introduce indoor air to one side portion 50a of the air filter 50 corresponding to the auxiliary outdoor air inlet 32.

Therefore, it is possible to utilize the one side portion 50a of the air filter 50 corresponding to the auxiliary outdoor air introduction part 30.

In particular, in the indoor air mode, both the outdoor air inlet 12 and the auxiliary outdoor air inlet 32 are closed so that one side portion 50a of the air filter 50 corresponding to the auxiliary outdoor air inlet 32 exists as a dead area where there is no flow of air. By introducing the indoor air to one side portion 50a of the air filter 50 in the dead area, it is possible to utilize one side portion 50a of the air filter 50.

In addition, the auxiliary indoor air introduction part 60 is installed in the partition wall 36 that separates the indoor air inlet 14 and the outdoor air inlet 12 from the auxiliary outdoor air inlet 32, whereby the indoor air is directly introduced from the indoor air inlet 14. Therefore, as shown in FIG. 2, even if the intake unit is installed on the side of the engine room, it is possible to introduce the indoor air.

Therefore, even though the intake unit is installed on the side of the engine room, the air can be introduced to one side portion 50a of the air filter 50 by using the auxiliary indoor air introduction part 60.

Accordingly, even though the intake unit is installed on the side of the engine room, it is possible to utilize the entire air filter 50 without leaving any dead area. As a result, it is possible to enhance the air conditioning efficiency in the passenger compartment.

Figure 3:
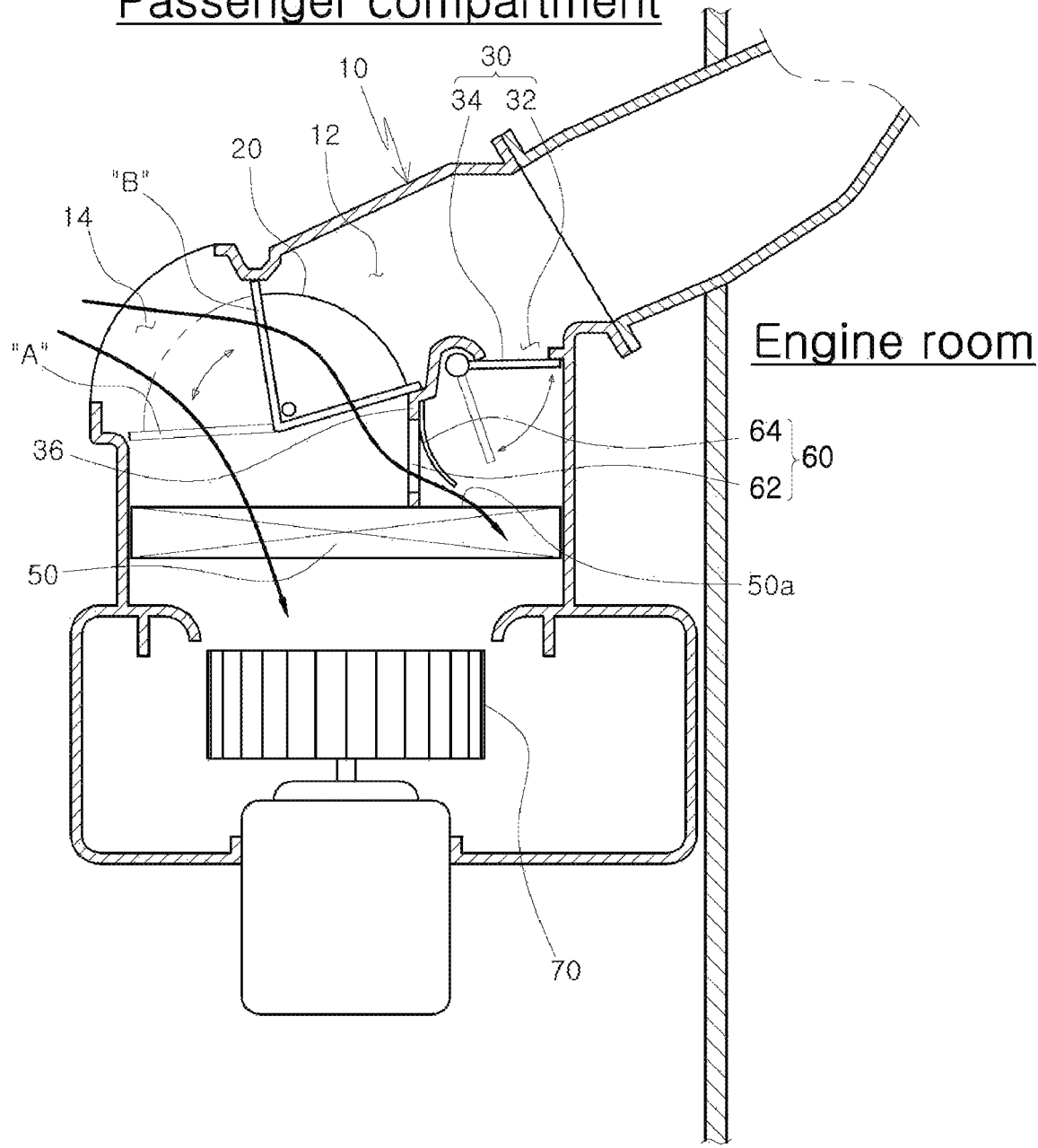
FIG. 3 is a view showing a vehicular air conditioning system according to one embodiment of the present invention in which an intake unit is installed inside a passenger compartment.

In addition, as shown in FIG. 3, the auxiliary indoor air introduction part 60 has a structure capable of introducing the indoor air even when the intake unit is installed inside the passenger compartment.

Therefore, it is possible to introduce the indoor air regardless of the installation position of the intake unit.

Accordingly, the intake unit can be used interchangeably in both the vehicle model in which the intake unit is installed inside the passenger compartment and the vehicle model in which the intake unit is installed on the side of the engine room side. As a result, the cost reduction can be expected by enabling the common use of components.

On the other hand, in the outdoor air mode, the intake door 20 opens the outdoor air inlet 12, and the auxiliary outdoor air door 34 opens the auxiliary outdoor air inlet 32, whereby the outdoor air is introduced through both the outdoor air inlet 12 and the auxiliary outdoor air inlet 32. In this case, the pressure in the outdoor air inlet 12 and the pressure in the auxiliary outdoor air inlet 32 remain the same. Thus, the auxiliary indoor air door 64 of the auxiliary indoor air introduction part 60 keeps the auxiliary indoor air inlet 62 in a closed state.

Therefore, in the outdoor air mode, the introduction of the indoor air through the auxiliary indoor air inlet 62 is limited.

In addition, when the auxiliary outdoor air door 34 is controlled in the outdoor air mode to open the auxiliary outdoor air inlet 32, particularly when the auxiliary outdoor air door 34 is controlled in the partial outdoor air introduction mode to open the auxiliary outdoor air inlet 32 in a state where the outdoor air inlet 12 is closed by the intake door 20 in the indoor air introduction mode, the auxiliary indoor air door 64 is affected by the change in the pressure on the side of the auxiliary outdoor air inlet 32 due to the driving speed of the motor vehicle and the number of rotation stages of the blower 70.

The auxiliary inner door 64, which is affected by the change in the pressure on the side of the auxiliary outdoor air inlet 32 due to the driving speed of the motor vehicle and the number of rotation stages of the blower 70, opens or closes the auxiliary indoor air inlet 62 according to the driving speed of the motor vehicle and the number of rotation stages of the blower 70.

Figure 4:
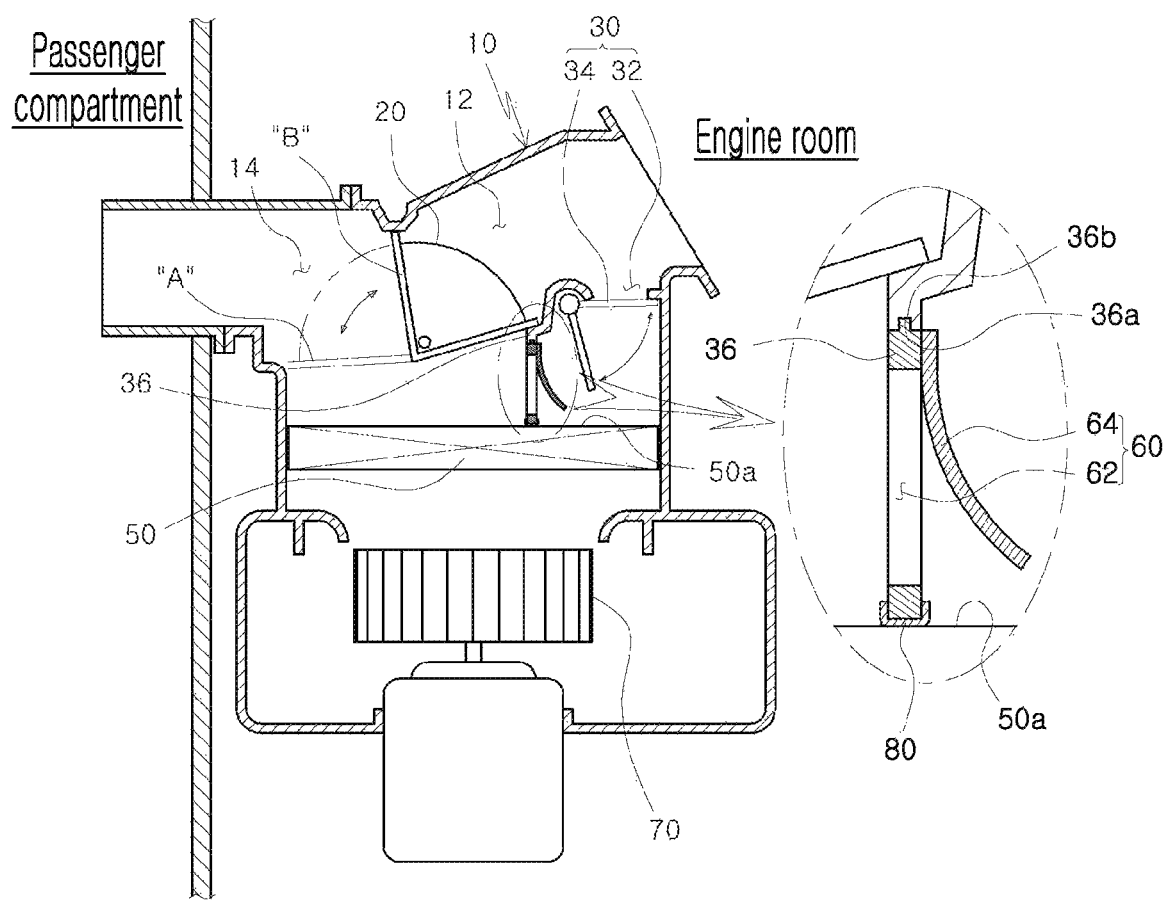
FIG. 4 is a view showing a vehicular air conditioning system according to another embodiment of the present invention.

Next, a vehicular air conditioning system according to another embodiment of the present invention will be described with reference to FIG. 4.

In the vehicular air conditioning system according to another embodiment of the present invention, the partition wall 36 that separates the indoor air inlet 14 and the outdoor air inlet 12 from the auxiliary outdoor air inlet 32 is configured as a separate body and assembled to the air conditioning case 10.

An assembly groove 10*a* and an assembly protrusion 36*a* are formed in the air conditioning case 10 and the partition wall 36, respectively. As the assembly groove 10*a* and the assembly protrusion 36*a* are coupled with each other, the partition wall 36 is fixedly assembled to the air conditioning case 10.

On the other hand, the auxiliary indoor air introduction part 60 is integrally formed with a partition wall 36 made of a separate body.

The auxiliary indoor air introduction part 60 integrally formed with the partition wall 36 is installed on the partition wall 36 during the manufacturing process of the partition wall 36.

The auxiliary indoor air introduction part 60 is installed on the air conditioning case 10 in the process of assembling the partition wall 36 to the air conditioning case 10.

A seal 80 is installed at the lower end of the partition wall 36. The seal 80 is disposed between the lower end of the partition wall 36 and the air filter 50. The seal 80 serves to hermetically seal a gap between the partition wall 36 and the air filter 50.

Figure 5:
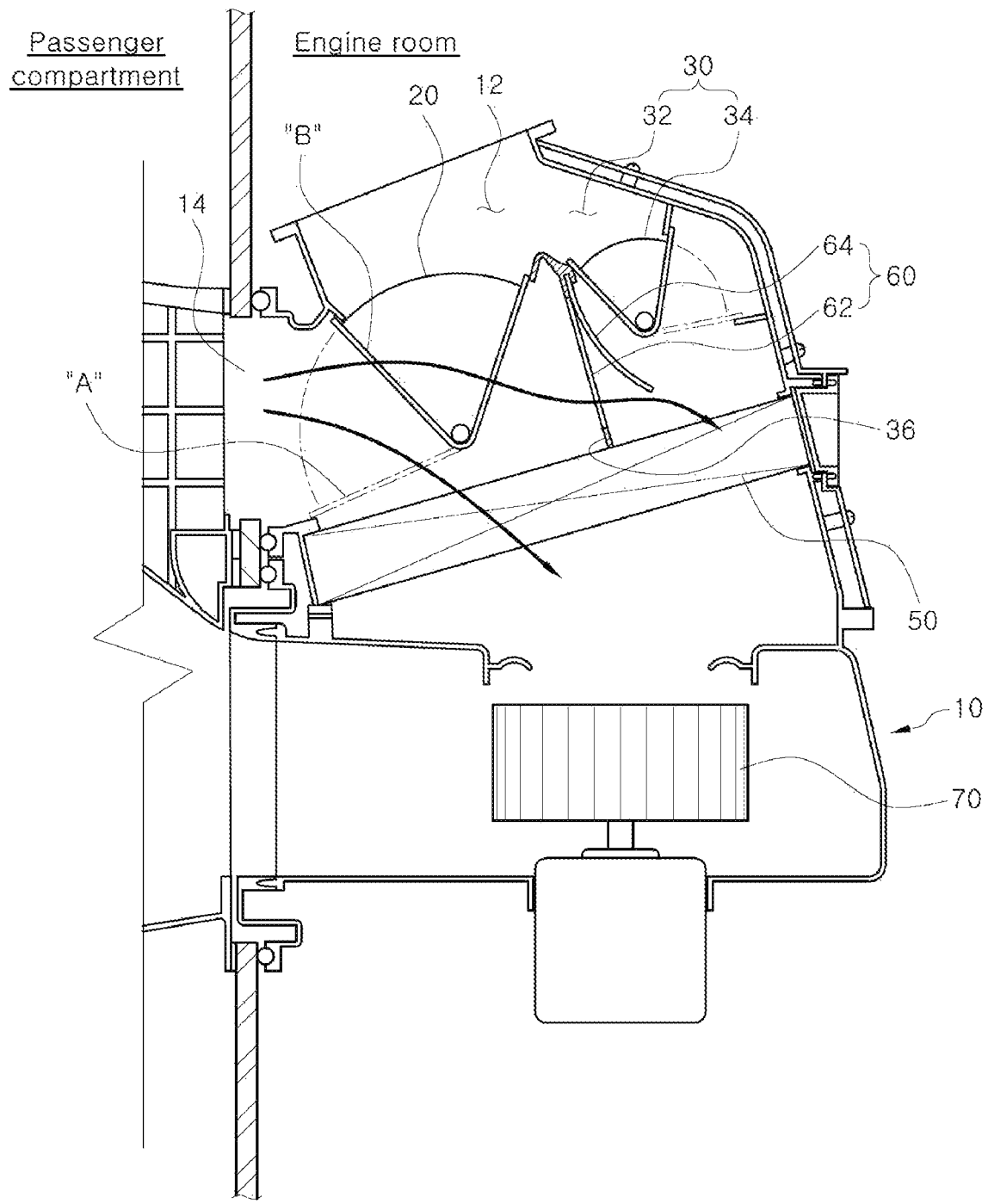
FIG. 5 is a view showing a vehicular air conditioning system according to a further embodiment of the present invention.

Next, a vehicular air conditioning system according to a further embodiment of the present invention will be described with reference to FIG. 5.

The vehicular air conditioning system according to a further embodiment of the present invention pertains to the mutual arrangement relationship between the air filter 50 and the partition wall 36 in the case where the air filter 50 is obliquely mounted with a certain inclination inside the air conditioning case 10.

When the air filter 50 is obliquely mounted with a certain inclination inside the air conditioning case 10, the partition wall 36 is formed vertically at an angle of 90° with respect to the air filter 50.

The reason for adopting this configuration is to ensure that when the auxiliary indoor air door 64 of the auxiliary indoor air introduction part 60 installed on the partition wall opens and closes the auxiliary indoor air inlet 62, the opening angle can be sufficiently secured. This enables the auxiliary indoor air door 64 to smoothly open and close the auxiliary indoor air inlet 62.

According to the vehicular air conditioning system having such a configuration, the auxiliary indoor air introduction part 60 is configured to introduce the indoor air from the indoor air inlet 14. Therefore, even though the intake unit is installed on the side of the engine room, the auxiliary indoor air introduction part 60 may be used to introduce the air to one side portion 50*a* of the air filter 50.

In addition, even though the intake unit is installed on the side of the engine room, the air can be introduced to one side portion 50*a* of the air filter 50 by using the auxiliary indoor air introduction part 60. Therefore, even though the intake unit is installed on the side of the engine room, it is possible to utilize the entire air filter 50 without leaving any dead area. As a result, it is possible to enhance the air conditioning efficiency in the passenger compartment.

In addition, the auxiliary indoor air introduction part 60 has a structure capable of introducing the indoor air from the indoor air inlet 14. Therefore, it is possible to introduce the indoor air even when the intake unit is installed inside the passenger compartment. Thus, it is possible to introduce the indoor air to one side portion 50*a* of the air filter 50 regardless of the installation position of the intake unit.

Accordingly, the intake unit can be used interchangeably in both the vehicle model in which the intake unit is installed inside the passenger compartment and the vehicle model in which the intake unit is installed on the side of the engine room side. As a result, the cost reduction can be expected by enabling the common use of components.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
   an intake unit configured to inhale an indoor air and an outdoor air, the intake unit including an outdoor air inlet configured to introduce the outdoor air, an indoor air inlet configured to introduce the indoor air and a door configured to selectively open the outdoor air inlet and the indoor air inlet,
   wherein the intake unit further includes an auxiliary indoor air introduction part configured to introduce the indoor air, and
   the auxiliary indoor air introduction part is configured to introduce a part of the indoor air existing on the side of the indoor air inlet, and
   wherein the intake unit further includes an auxiliary outdoor air inlet configured to introduce the outdoor air and a partition wall configured to separate the indoor air inlet and the outdoor air inlet from the auxiliary outdoor air inlet, and
   the auxiliary indoor air introduction part is installed on the partition wall to introduce the indoor air existing in the indoor air inlet.

2. The system of claim 1, wherein the auxiliary indoor air introduction part includes:
   an auxiliary indoor air inlet formed in the partition wall so as to introduce a part of the indoor air existing on the side of the indoor air inlet and send the introduced indoor air toward the auxiliary outdoor air inlet; and
   a flap type auxiliary indoor air door installed on the partition wall so that when a pressure on the side of the auxiliary outdoor air inlet is lower than a pressure on the side of the indoor air inlet, the auxiliary indoor air door opens the auxiliary indoor air inlet according to a differential pressure.

3. The system of claim 2, wherein the intake unit further includes an air filter installed on a downstream side of the indoor air inlet, the outdoor air inlet and the auxiliary outdoor air inlet to filter the air inhaled through the indoor air inlet, the outdoor air inlet and the auxiliary outdoor air inlet, and
   the auxiliary indoor air introduction part is configured to introduce a part of the indoor air existing on the side of the indoor air inlet and send the introduced indoor air to one side portion of the air filter corresponding to the auxiliary outdoor air inlet.

4. The system of claim 3, wherein the intake unit further includes an intake door configured to selectively open the outdoor air inlet and the indoor air inlet, and an auxiliary outdoor air door configured to adjust an opening degree of the auxiliary outdoor air inlet.

5. The system of claim 4, wherein the auxiliary indoor air introduction part is configured to introduce a part of the indoor air inhaled through the indoor air inlet and send the introduced indoor air to one side portion of the air filter corresponding to the auxiliary outdoor air inlet when both the outdoor air inlet and the auxiliary outdoor air inlet are closed by the intake door and the auxiliary outdoor air door in an indoor air mode.

6. The system of claim 5, wherein the auxiliary indoor air door is configured to keep the auxiliary indoor air inlet in a closed state when the intake door opens the outdoor air inlet and the auxiliary outdoor air door opens the auxiliary outdoor air inlet in an outdoor air mode so that the outdoor air is introduced through both the outdoor air inlet and the auxiliary outdoor air inlet.

7. The system of claim 6, wherein the auxiliary outdoor air door is controlled in a partial outdoor air introduction mode to open the auxiliary outdoor air inlet to introduce the outdoor air when the intake door closes the outdoor air inlet in the indoor air mode, and
the auxiliary indoor air door is configured to open or close the auxiliary indoor air inlet in the partial outdoor air introduction mode according to a driving speed of a motor vehicle and a number of rotation stages of a blower.

8. The system of claim 1, wherein the intake unit is arranged on the side of an engine room of a motor vehicle.

9. The system of claim 8, wherein the indoor air inlet is in communication with a passenger compartment through a duct.

10. The system of claim 1, wherein the partition wall on which the auxiliary indoor air inlet is installed is formed of a separate body and assembled to an air conditioning case.

11. The system of claim 10, wherein the intake unit further includes a seal installed at a lower end of the partition wall, and the seal is configured to hermetically seal a gap between the lower end of the partition wall 36 and an air filter.

12. The system of claim 3, wherein the air filter is obliquely mounted with a certain inclination inside air conditioning case, and
the partition wall that separates the indoor air inlet and the outdoor air inlet from the auxiliary outdoor air inlet is formed vertically at an angle of 90° with respect to the air filter.

* * * * *